United States Patent [19]

Dehn

[11] 4,006,338
[45] Feb. 1, 1977

[54] MICROWAVE HEATING APPARATUS WITH IMPROVED MULTIPLE COUPLERS AND SOLID STATE POWER SOURCE

[75] Inventor: Rudolph A. Dehn, Schenectady, N.Y.

[73] Assignee: General Electric Company, Schenectady, N.Y.

[22] Filed: Dec. 31, 1975

[21] Appl. No.: 645,511

[52] U.S. Cl. .................. 219/10.55 F; 219/10.55 A; 219/10.55 E
[51] Int. Cl.² .......................................... H05B 9/06
[58] Field of Search ............ 219/10.55 R, 10.55 M, 219/10.55 A, 10.55 E, 10.55 F

[56] References Cited
UNITED STATES PATENTS

| 3,887,722 | 6/1975 | Douglas et al. | 219/10.55 A |
| 3,941,641 | 3/1976 | Heller, Jr. et al. | 219/10.55 M |

Primary Examiner—Arthur T. Grimley
Attorney, Agent, or Firm—Donald R. Campbell; Joseph T. Cohen; Jerome C. Squillaro

[57] ABSTRACT

A cut-off tubular housing has flat surfaces for mounting multiple solid state microwave oscillators using microstrip circuitry, each exciting a wire-like resonant coupler wound on a central dielectric support tube for receiving a frankfurter or other material body. The couplers are longitudinally spaced and angularly staggered so that energy coupled to different regions of the body is absorbed by the material to thereby isolate couplers and hence sources even at close spacings. In a rectangular configuration, a non-resonant box has a planar array of serpentine or spiral resonant couplers with adjacent couplers oriented orthogonally to minimize coupling.

17 Claims, 8 Drawing Figures

MICROWAVE HEATING APPARATUS WITH IMPROVED MULTIPLE COUPLERS AND SOLID STATE POWER SOURCE

BACKGROUND OF THE INVENTION

This invention relates to microwave apparatus for heating food and other material bodies, and more particularly to improved, more easily manufactured microwave heating apparatus with multiple energy couplers and solid state power sources.

In the ordinary microwave oven a single high power microwave generator such as a magnetron tube is used in conjunction with a single coupler or antenna element, and the energy fills the entire oven cavity. There are difficulties at present with various schemes to use a plurality of low power sources such as microwave solid state devices. Although it is possible to combine the individual power outputs of a few low power sources into a single transmission line, the total power that can be produced is limited and is best utilized as the equivalent of a single higher power source. If multiple energy couplers are used in conjunction with a plurality of independent low power microwave sources, the problem to be overcome is that the individual sources may destructively interfere with one another.

In concurrently filed application Ser. No. 645,795 by John Maurer entitled "Microwave Heating Apparatus with Multiple Coupling Elements and Microwave Power Sources," assigned to the same assignee as this invention, a microwave heating apparatus is disclosed which operates on the principle that energy generated by each power source is coupled to a different region of the body being heated and is substantially absorbed by the material to thereby provide isolation between coupling elements and hence power sources. The surrounding conductive enclosure tube is cut off and can be extended lengthwise so that higher order mode energy decays and continuous processing operations are possible. The preferred embodiment is a frankfurter warmer with cylindrical enclosure and dielectric load support tubes and several axially spaced helical coupling elements that are partially wrapped about the support tube with a smooth curving transition between the two tubes for low reflection. A rectangular configuration for industrial heating applications is also described. The present invention relates to improvement and further development of this type of microwave heating apparatus.

Summary of the Invention

In a microwave heating apparatus with a tubular configuration for heating frankfurters and similarly shaped material bodies as just described, more easily manufactured energy couplers with closer spacings are realized by using resonant couplers that are angularly staggered relative to adjacent couplers in a predetermined arrangement whereby the electric fields at the open ends of adjacent couplers are substantially orthogonal or opposing to minimize cross coupling. Typically, the couplers are somewhat shorter than ¼ wavelength at the operating frequency so as to exhibit a low Q resonance taking into account the loading effects of the dielectric support tube and body being heated. The conductive tubular housing desirably has a polygonal cross section with dimensions small enough so as to be cut off, and a plurality of solid state microwave oscillators using microstrip oscillator circuitry are mounted externally on one or more flat sections of the polygonal housing. Means are provided for connecting each coupler to a different one of the microwave oscillators, suitably including a microstrip transmission line formed on the same circuit board as the respective microstrip oscillator circuitry. In the preferred embodiment, the housing is hexagonal and planar couplers are mounted on oppositely inclined flat sections and are further selectively wound in opposite directions on the work load support tube to implement an angularly staggered arrangement for a set of couplers. Even at close spacings, energy coupled to different regions of the body is substantially absorbed by the material to provide isolation between couplers and hence sources. Assuming that the tubular housing is elongated sufficiently, continuous processing operations are possible.

In a rectangular configuration for heating frozen food packages and other work loads with a rectangular slab shape, an enclosed rectangular housing or box is used having dimensions so as to be non-resonant. A planar array of wire-like resonant couplers, such as ¼ wavelength serpentine or flat spiral units, is mounted adjacent the dielectric support member or body receiving space. Adjacent couplers are oriented orthogonally relative to one another whereby close spacings can be used without coupling to other units. In the preferred embodiment, two planar arrays are employed above and below the body receiving space, and ½ wavelength resonant couplers are connected at the center to a solid state microwave oscillator operated at the selected frequency. Industrial heating applications are also disclosed.

DESCRIPTION OF THE PREFERRED EMBODIMENTS

Figure 1:
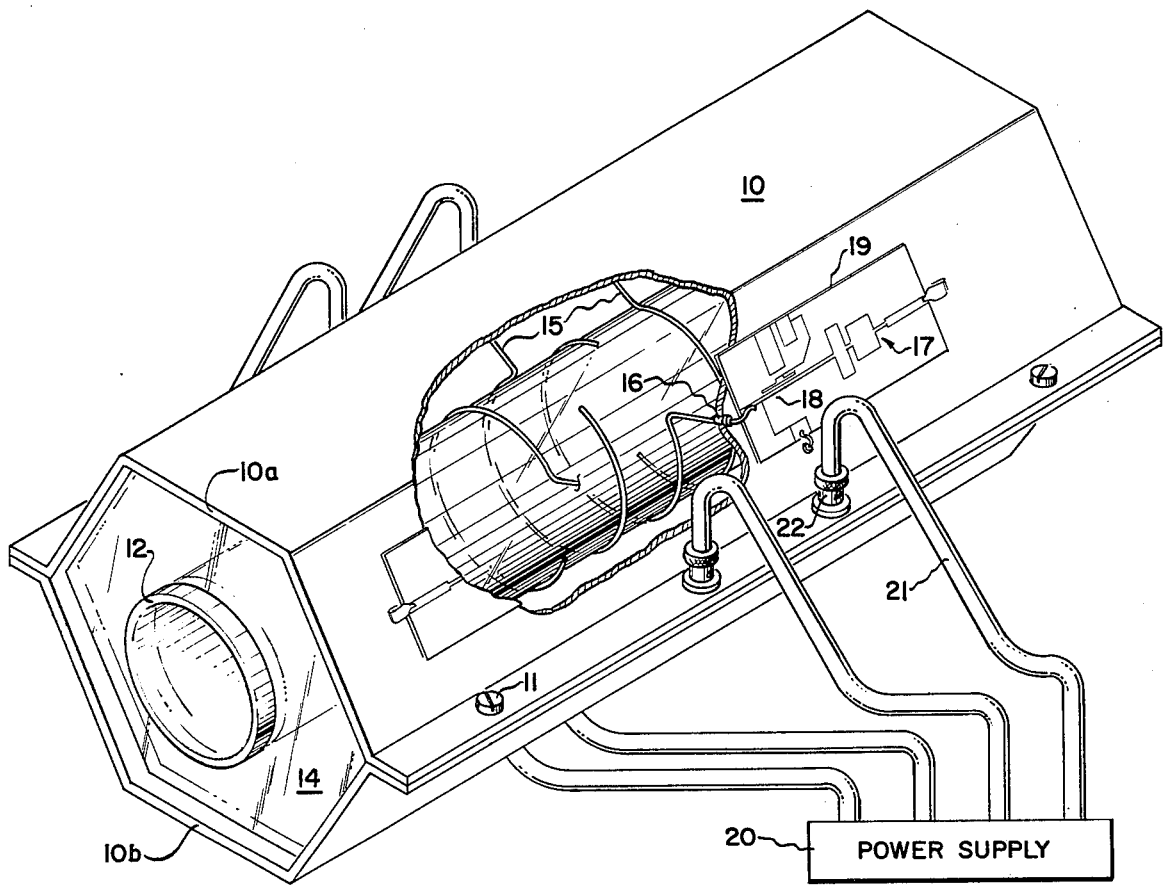
FIG. 1 is a schematic perspective view, partially cut away to reveal interior detail, of a microwave heating apparatus constructed in accordance with the invention in an elongated tubular configuration for heating frankfurters.
Figure 2:
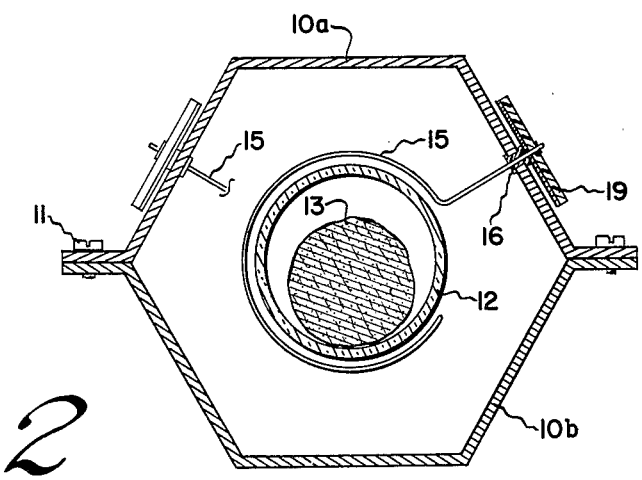
FIG. 2 is a vertical cross section through the apparatus of FIG. 1 showing a single resonant coupler.

The elongated tubular embodiment of the microwave heating apparatus shown in FIGS. 1 and 2 is discussed with regard to a microwave oven for warming or cooking frankfurters, but it can be used to heat other similar food items and has industrial applications for the heating of various appropriately shaped material bodies. As will be evident, the apparatus is suitable for continuous processing operations on a line of frankfurters fed end to end in sequence as well as for heating single frankfurters one at a time. The microwave oven is comprised by an electrically conductive tubular housing or enclosure tube 10 made of copper or other suitable metal and preferably having a polygonal cross section so as to provide flat surfaces for the mounting of solid state power source circuit boards. A hexagonal tubular housing is illustrated, fabricated as upper and lower housing sections 10a and 10b with horizontal flanges secured together by fasteners 11. The tubular housing has a small enough cross section that all of the possible waveguide modes are cut off in the empty tube at the frequency of the generated electromagnetic energy, namely, 2450 MHz. For this section, as in a circular waveguide, the lowest order mode is the $TM_{01}$ mode which is cut off at a dimension determined by the formula $\lambda_c \approx 3.4r$, where $r$ in this case is the distance from the center to the apex of the hexagon. Thus, electromagnetic energy does not propagate in the empty tube and although higher order, evanescent modes may exist, the electromagnetic energy substantially decays and is not harmful to a human operator when tubular housing 10 is extended axially at either end a sufficient distance beyond the couplers. For example, the axial extension at either end can be equal to twice the diametrical dimension.

A dielectric support tube or member 12 enclosing a body receiving space for receiving frankfurter 13 or other material body being heated is mounted centrally within tubular housing 10. Support tube 12 is made of a low loss dielectric such as glass or plastic, and is mounted coaxially within tubular housing 10 by means of a pair of end plates 14. Thus, support tube 12 is open at both ends and may support a conveyor belt arrangement (not here shown) for the continuous processing of a line of frankfurters. A plurality of electrically conductive, wire-like, resonant energy couplers 15 are mounted within tubular housing 10, longitudinally spaced from one another, for coupling electromagnetic energy to different regions of the work load. Resonant couplers 15 preferably are made of metallic wire but can also be flat ribbon having a width narrow as compared to the spacing between adjacent units. Each resonant coupler 15 desirably has a planar configuration and is partially wound around dielectric support tube 12, adjacent couplers or a predetermined set of adjacent couplers being angularly staggered relative to one another or minimize coupling between adjacent units as is explained in detail later. It will be noted that support tube 12 not only supports the frankfurter but allows minimum spacing between it and the several resonant couplers 15 while keeping them mechanically isolated.

At its outer end, each coupler 15 is attached to an insulated pin 16 or other type of insulated connector means mounted in an opening in tubular housing 10, and as here shown every other coupler is supported by one inclined housing wall section while the alternate couplers are supported by the oppositely inclined housing wall section. Each of the resonant couplers is excited by an independent solid state microwave oscillator 17, and the energy generated by each power source is transmitted by a transmission line 18 to the respective insulated connector means 16. The oscillator circuitry and transmission line are desirably fabricated in microstrip form on a single microstrip circuit board 19 attached to the external surface of tubular housing 10. Thus, each resonant coupler 15 is excited by a independent power source, which consequently can be a low power source. Assuming that suitable isolation techniques are used, it is desirable to have single power supply 20 which can be connected through separate coaxial cables 21 to a coaxial input jack 22 for each individual microwave oscillator.

Figure 3:
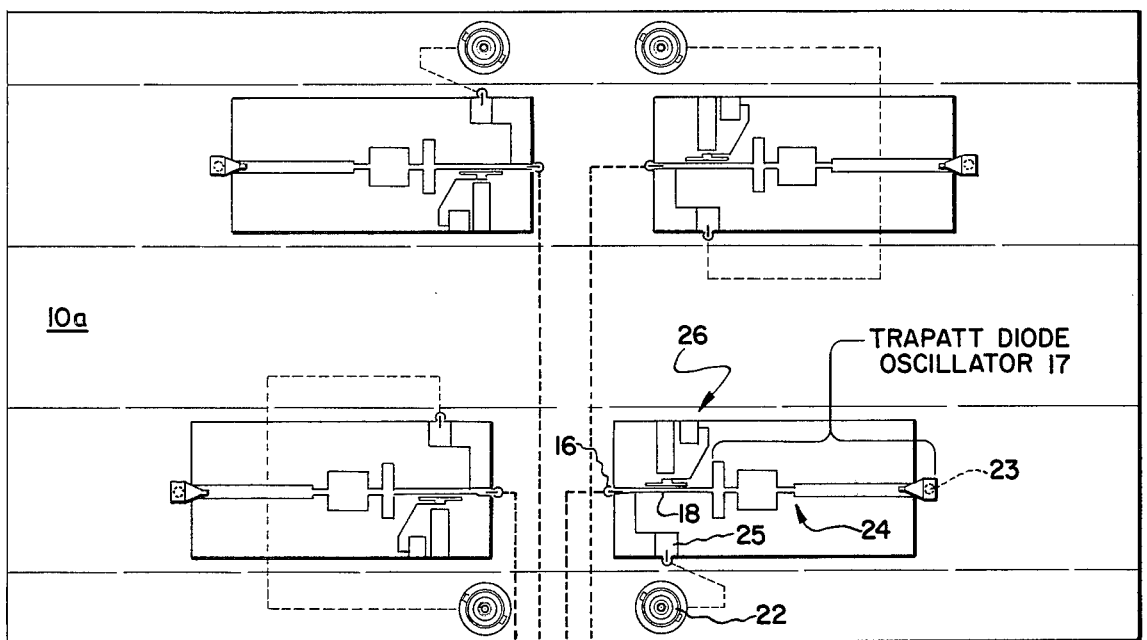
FIG. 3 is a developed or partly rotated view of the top half of the tubular housing in FIG. 1 and attached solid state power sources using microstrip circuitry.
Figure 4:
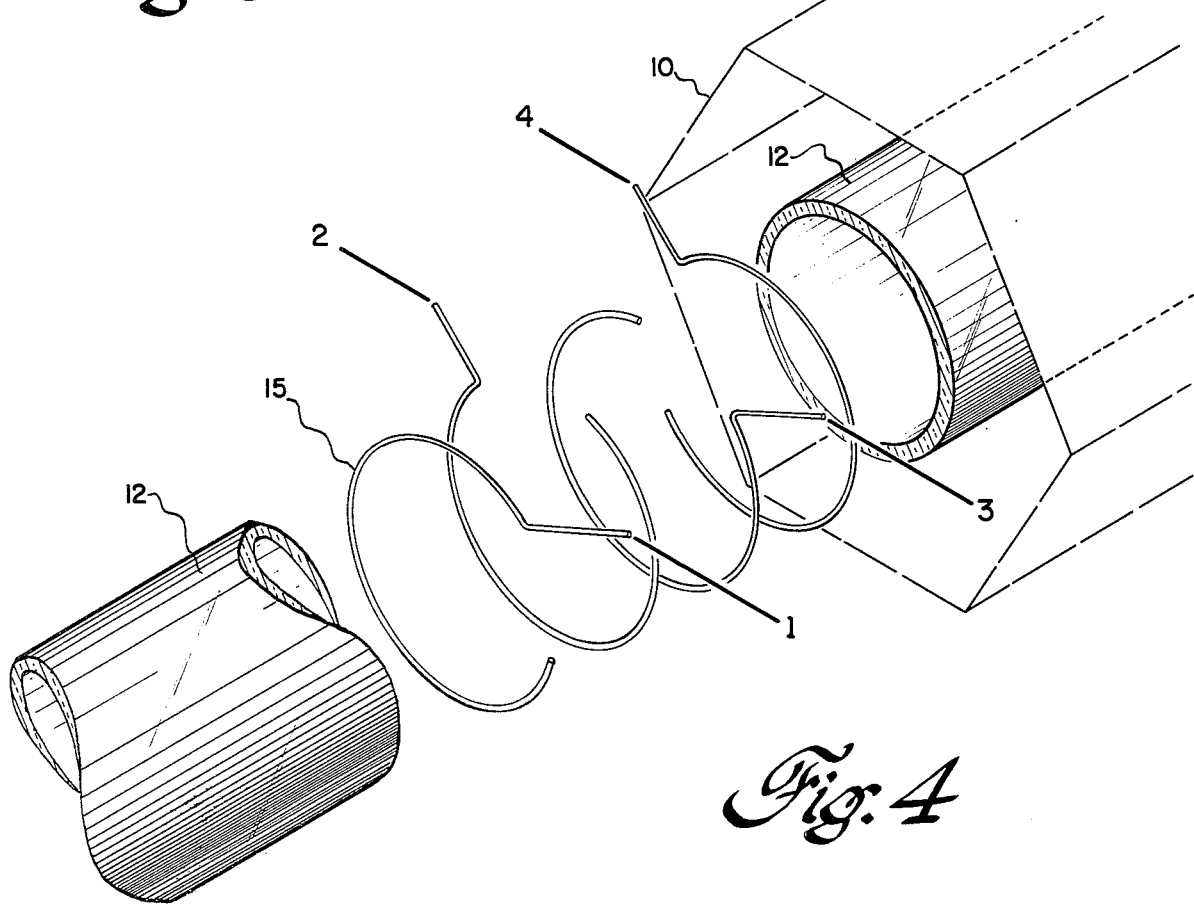
FIG. 4 is a schematic perspective view with portions cut away illustrating the relative positions of the several couplers around the work load support tube.

FIG. 3 shows a developed or rotated view of upper housing section 10a with four identical microwave power source modules for the set of four angularly staggered couplers 15 illustrated in both FIGS. 1 and 4. By way of example, a TRAPATT (trapped plasma avalanche triggered transit) diode oscillator 17 can be used, although other types of solid state microwave oscillators are also appropriate. Solid state diode 23 is attached to the housing wall for grounding and heat sinking, while the other electrode is coupled by means of a clip to microstrip oscillator circuitry 24 having a configuration as is known in the art. High repetition frequency dc pulses generated by power supply 20 are fed through input jack 22 and a bias circuit 25 to oscillator 17. Circuit board 19 in addition to bias circuit 25 may also include a capacitively coupled diode detection circuit 26 for monitoring purposes, and a continuous ground plne is formed on the reverse side. The principles of operation of TRAPATT diode oscillators have been discussed generally in prior art publications and need not be reviewed in detail here. Instead of providing individual circuit boards for each microwave power module, it is evident that the microstrip circuitry for a plurality of modules or all the modules may be fabricated on a single circuit board. Solid state microwave power sources using microstrip circuitry have potential for high reliability and low cost fabrication, and while each source is limited in power output, a multiplicity of such modules can be used to realize the total power needed for a given purpose. In view of the substantial isolation between sources, each source can be inserted, tuned, and operated independently of the others.

The individual planar resonant couplers 15 (see FIG. 4) are somewhat shorter than ¼ wavelength at the operating frequency so that they exhibit a low Q resonance when the capacitive effects of dielectric support tube 12 and the dielectric loading of frankfurter 13 or other work load are taken into account. Assuming that support tube 12 has a diameter large enough to receive an ordinary sized frankfurter, each resonant coupler 15 has about three-quarters of a turn wound around the support tube and can be bent at right angles to form a "radially" extending portion for attachment to insulated pin 16. For some applications, it might be advantageous to use a shortened ¾ λ or 5125 λ resonant coupler. In such an electromagnetic energy coupler, the voltage and electric field is high at the open end. These couplers are angularly staggered and oriented in such fashion that fields from adjacent units are at least orthogonal in order to minimize coupling. This is explained with regard to a set of four resonant couplers 15 in FIG. 4, hereafter referred to as couplers 1–4, each of which is excited by the individual power sources numbered in the same manner in FIG. 3. As was mentioned, the staggered arrangement is implemented by mounting alternate units from at least two oppositely inclined wall sections of hexagonal housing 10 and also by selectively winding the units in opposite directions on support tube 12. Couplers 1 and 2 are wound in the same direction on support tube 12, such as clockwise, however the open ends are at least about 90° apart whereby the orthogonality of fields provides cross polarization of waves excited between the work load and housing. Couplers 3 and 4 are further angularly staggered with respect to couplers 1 and 2 to achieve orthogonality for these pairs also. These couplers are wound in the opposite direction on support tube 12, namely counterclockwise, with the result that the open ends of couplers 3 and 4 are also at least about 90° apart. Further, counter-wound couplers 1 and 3 are substantially isolated from one another since their respective open ends are also at least about 90° apart, and the same is true of the open ends of couplers 2 and 4. The open ends of immediately adjacent, counter-wound couplers 2 and 3, and thus their electric fields, are almost opposing and there is only small amount of coupling between these units. With the 90° staggered arrangement that is illustrated, isolation among power source ports is at least 10 dB.

In the event that another set of four couplers is required because of the length of work load, the angular orientations of couplers 1–4 can be repeated. In the two adjacent sets of four each the two couplers 1, although at the same angular orientation, are a sufficient distance apart that the material substantially attenuates the wave energy and the power source ports are substantially isolated. By way of example, a microwave oven was built with coupler spacings of approximately 0.5 inch, and consequently four units are required for a small cocktail sausage while a regular size frankfurter requires eight units. To further understand the angularly staggered arrangement in FIG. 4, alternative arrangements will be mentioned with their deficiencies. Assuming that couplers 1 and 2 are oriented as shown, this pattern cannot be repeated for the next adjacent pair due to the large amount of coupling between couplers 1 and 3 and couplers 2 and 4. While it would be desirable to have the open ends of couplers 1 and 2, 180° apart for improved isolation between these units, coupling to the alternate ports of the same angle (couplers 1 and 3 and also couplers 2 and 4) was found to be too strong.

To briefly review the operation, the several longitudinally spaced resonant couplers 15, each having an independent low power source of electromagnetic energy, couple energy to different regions of the material body being heated. Assuming that adjacent couplers or a predetermined number of adjacent couplers are angularly staggered whereby their electric fields are at least orthogonal relative to one another, the electromagnetic energy is substantially absorbed by the material body and there is substantial isolation between resonant couplers 15, and hence between microwave oscillators 17. Consequently, each power source has as a load its own portion of the material being heated, and is independent of other power sources except for the small amount of coupling that exists between the resonant couplers 15 themselves. The use of multiple inputs allows the total power available from a number of sources to be applied to the material without requiring prior combination of these powers into a single transmission line. As here demonstrated, several unsynchronized microwave power modules mounted on the small microwave oven utilize a coupler geometry with insignificant coupling among sources and with efficient energy transfer to the work load being heated. In this regard, about ¾ of a turn on support tube 12 is the minimum for good results. Since heating by conduction is required to distribute the heat from under a planar resonant coupler, the achievement of close spacings by using the angularly staggered geometry results in an increased rate and uniformity of microwave heating. In a microwave oven all of the individual power modules operate at approximately the same microwave frequency, but from a theoretical standpoint the substantial isolation between power sources, assuming that tubular housing 10 is cut off, allows the use of different operating frequencies. As was mentioned, since tubular housing 10 is cut off when not filled with the frankfurter or other absorbing material, and the absorption in the materials strongly attenuates the electromagnetic energy, very low leakage occurs with the ends left open when the housing is extended sufficiently at either end beyond the couplers. Accordingly, the apparatus is applicable to continuous processing operations. Moreover, the microwave heating apparatus has industrial heating applications.

Figure 6:
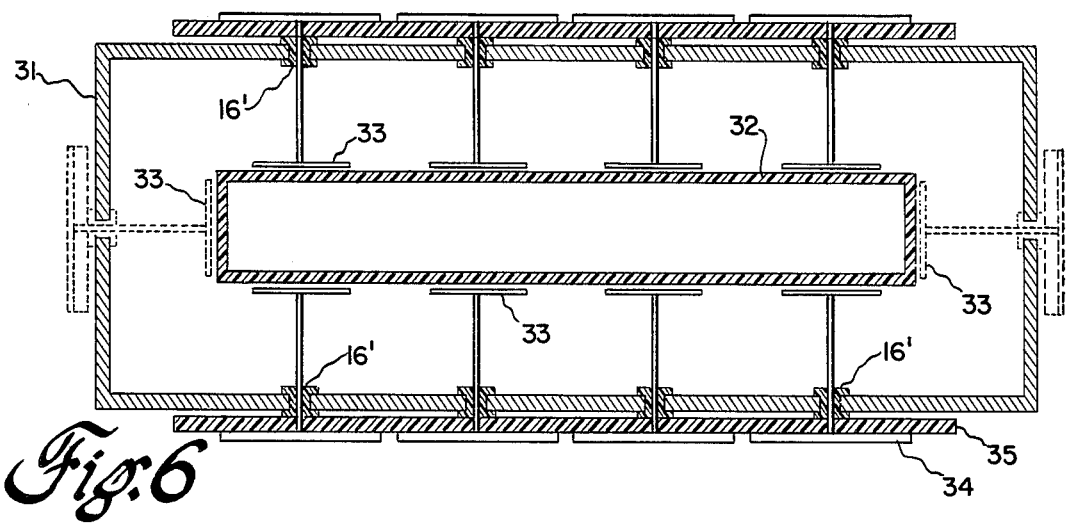
FIG. 6 is a vertical cross section taken through the interior of the oven in FIG. 5.
Figure 7:
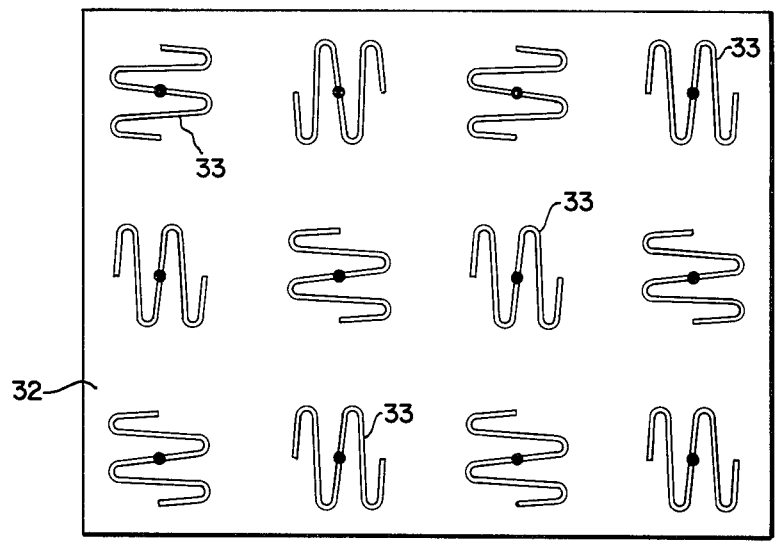
FIG. 7 is a plan view of one array of the resonant serpentine couplers shown in FIG. 6.
Figure 5:
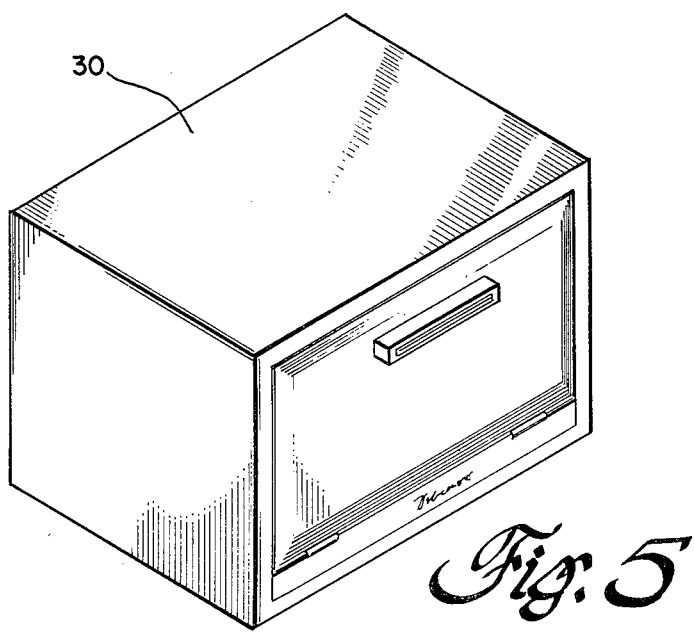
FIG. 5 is an exterior perspective view of a second embodiment of the invention in a rectangular box configuration for heating frozen food packages.
Figure 8:
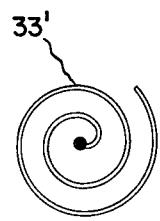
FIG. 8 illustrates an alternate flat spiral resonant coupler.

Other configurations of resonant energy couplers may be employed to match the specific work load of interest. One such alternate, rectangular configuration is shown in FIGS. 5–7 for a rectangular parallelepiped work load such as a frozen food package for vegetables and fruits. The microwave oven for this application is preferably a six-sided box 30 (FIG. 5) having a door to gain access to the interior. Within box 30 is a conductive, enclosed rectangular housing 31 having physical dimensions, as is known in the art, such that the housing is non-resonant at a selected microwave frequency, typically 2450 MHz. A five-sided dielectric support member 32 enclosing a body receiving space for receiving the material body to be heated is suitably mounted within box 31. If desired, dielectric support member 32 can take the form of a single shelf. At least one planar array of electrically conductive, wire-like, resonant energy couplers 33 is mounted adjacent the body receiving space and dielectric support member 32, and preferably there are two such planar arrays, one above and one below the work load respectively parallel to its major surfaces. As shown in FIG. 7, resonant couplers 33 are shortened $\lambda/2$ planar serpentine couplers taking into account the capacitive effects and relatively high dielectric constant of the work load. The physical lengths are such that some folding into a serpentine pattern is required. The connection to the respective insulated connector means 16', secured in an opening in non-resonant housing 31, is at the center of the coupler, and hence there are effectively two foreshortened $\lambda/4$ resonant couplers, each having the high voltage and high electric field at its open end. Each planar array as shown in FIG. 7 is desirably an orthogonal array with the individual couplers 33 arranged in rows and columns, and to minimize cross coupling adjacent couplers 33 are further orthogonally oriented relative to one another. Thus, the electric fields at open ends of adjacent couplers are substantially orthogonal to one another to realize close spacings between the couplers with substantial isolation between power source ports. Instead of constructively interferring, which would be the case if the electric fields were oriented in the same direction, there is some destructive interference of the waves propagating between the work load and housing 31. The couplers may take other forms, such as the planar, spiral, shortened $\lambda/4$ resonant coupler 33' shown in FIG. 8. The array of resonant couplers 33' are also oriented orthogonally to one another. The geometric disposition of couplers 33 or 33' and the total number of units which may be used is governed by the permissible cross coupling between power source ports, and typically 10 dB decoupling is required to avoid degradation of the microwave oscillator output.

The top and bottom planar arrays of spaced couplers 33 or 33' need not be in register as illustrated in FIG. 6, but may offset to further reduce unwanted coupling between power source ports. Furthermore, vertically aligned resonant couplers in the top and bottom arrays are desirably orthogonal or rotated relative to one another to minimize cross coupling. As is shown in dashed lines, additional linear arrays of resonant couplers may be provided to heat the side or end surfaces of the work load. The microstrip transmission line and microstrip oscillator circuitry associated with each solid state microwave power source is indicated generally at 34 and is identical to that shown in FIG. 3. The microstrip circuitry for the plurality of solid state power sources for each planar or linear coupler array can be fabricated on a single circuit board 35 mounted externally on the respective wall of oven 31.

While the invention has been particularly shown and described with reference to several preferred embodiments thereof, it will be understood by those skilled in the art that various changes in form and details may be made therein without departing from the spirit and scope of the invention.

The invention claimed is:

1. A microwave heating apparatus comprising
   an electrically conductive tubular housing having transverse physical dimensions such that the tubular housing is cut off at a selected microwave frequency and does not propagate electromagnetic energy,
   a dielectric support member mounted centrally within said tubular housing and defining a body receiving space for a material body to be heated,
   a plurality of electrically conductive, wire-like resonant energy couplers supported within said tubular housing each at least partially adjacent said dielectric support member, said couplers being spaced longitudinally and adjacent couplers being angularly staggered relative to one another in a predetermined arrangement whereby the electric fields from adjacent couplers are at least orthogonal and energy coupled to different regions of the material body is substantially absorbed thereby to provide isolation between the couplers,
   a plurality of independent solid state microwave oscillators for generating electromagnetic energy at approximately the selected frequency, and means for connecting each coupler to a different one of said microwave oscillators.

2. A microwave heating apparatus according to claim 1 wherein said dielectric support member has a tubular configuration, and said couplers are planar couplers effectively supported by said tubular housing and partially wound about said support member, said couplers being selectively wound in opposite directions on said support member.

3. A microwave heating apparatus according to claim 1 wherein said dielectric support member is tubular and said couplers are planar, shortened ¼ wavelength resonant couplers partially wound about said tubular support member.

4. A microstrip heating apparatus according to claim 3 wherein said couplers are selectively wound in opposite directions on said tubular support member.

5. A microwave heating apparatus according to claim 1 wherein said tubular housing has a polygonal cross section and is extended longitudinally a sufficient distance at either end beyond said couplers so that the electromagnetic energy substantially decays.

6. A microwave heating apparatus according to claim 5 wherein said solid state microwave oscillators are each comprised by microstrip oscillator circuitry and are mounted on a plurality of flat sections of said polygonal tubular housing.

7. A microwave oscillator according to claim 6 wherein said means for connecting each coupler to a different one of said microwave oscillators comprises microstrip transmission line means and further comprises insulated connector means mounted in an opening in said tubular housing and to which one end of the respective coupler is attached, said microstrip oscillator circuitry and microstrip transmission line means being contained on a single circuit board.

8. A microwave heating apparatus comprising
   an electrically conductive tubular housing having a hexagonal cross section with dimensions such that the tubular housing is cut off at a selected microwave frequency and does not propagate electromagnetic energy,
   a circular dielectric support tube mounted centrally within said tubular housing and enclosing a body receiving space for receiving a material body to be heated,
   a plurality of electrically conductive, wire-like, resonant energy couplers each effectively supported at one end by said tubular housing and partially wound round said support tube, said couplers being spaced longitudinally along said support tube and a predetermined set of adjacent couplers being angularly staggered relative to one another, whereby the electric fields at the other open ends of said adjacent couplers are at least orthogonal and energy coupled to different regions of the material body is substantially absorbed thereby to provide isolation between the couplers,
   a plurality of independent solid state microwave oscillators each comprised by microstrip oscillator circuitry for generating electromagnetic energy at the selected frequency, said microwave oscillators being mounted on a plurality of flat sections of said hexagonal tubular housing, and means for connecting each coupler to a different one of said microwave oscillators.

9. A microwave heating apparatus according to claim 8 wherein said predetermined set of angularly staggered adjacent couplers includes first and second couplers wound in the same direction with open ends at least about 90° apart, and third and fourth couplers wound in the opposite direction with open ends at least about 90° apart, said first and third couplers and said second and fourth couplers also having their open ends at least about 90° apart.

10. A microwave heating apparatus according to claim 9 wherein said means for connecting each coupler to a different one of said microwave oscillators comprises microstrip transmission line means and further comprises insulated connector means mounted in an opening in said tubular housing and to which one end of the respective coupler is attached, said microstrip oscillator circuitry and microstrip transmission line means being contained on a single circuit board.

11. A microwave heating apparatus according to claim 10 wherein said support tube is open-ended and said tubular housing is extended longitudinally a sufficient distance at either end beyond said couplers so that the electromagnetic energy substantially decays.

12. A microwave heating apparatus comprising
an electrically conductive enclosed rectangular housing having physical dimensions such that the housing is non-resonant at a selected microwave frequency,
a dielectric support member mounted within said housing and defining a body receiving space for receiving a material body to be heated,
a planar array of electrically conductive, wire-like, resonant energy couplers mounted adjacent said body receiving space, said resonant couplers being spaced from one another and adjacent couplers being orthogonally oriented relative to one another, whereby the electric fields at open ends of said adjacent couplers are substantially orthogonal and energy coupled to different regions of the material body is substantially absorbed thereby to provide isolation between the couplers,
a plurality of independent solid state microwave oscillators for generating electromagnetic energy at approximately the selected frequency, and means for connecting each resonant coupler to a different one of said microwave oscillators.

13. A microwave heating apparatus according to claim 12 wherein each resonant coupler is a planar, serpentine, shortened one-quarter wavelength coupler.

14. A microwave heating apparatus according to claim 12 wherein each resonant coupler is a planar, serpentine, shortened one-half wavelength coupler attached at its center to said connecting means.

15. A microwave heating apparatus according to claim 12 wherein each resonant coupler is a planar, spiral, shortened one-quarter wavelength coupler.

16. A microwave heating apparatus according to claim 12 further including a second planar array of said resonant energy couplers mounted adjacent the body receiving space and physically opposing said first-mentioned planar array of resonant energy couplers, and additional solid state microwave oscillators and means for connecting each resonant coupler in said second array to a different one of said additional microwave oscillators.

17. A microwave heating apparatus according to claim 12 wherein each solid state microwave oscillator is comprised by microstrip oscillator circuitry, and said means for connecting each resonant coupler to a different one of said microwave oscillators includes microstrip transmission line means and further includes insulated connector means mounted in an opening in said housing and to which the respective resonant coupler is attached, said microstrip oscillator circuitry and microstrip transmission line means being contained on a circuit board mounted on said housing.

* * * * *